United States Patent
Busch et al.

(10) Patent No.: US 7,261,360 B2
(45) Date of Patent: Aug. 28, 2007

(54) DEVICE FOR CLOSING AN ACCESS OPENING IN A MOTOR VEHICLE OUTER SKIN

(75) Inventors: Marcus Busch, Lehrte (DE); Etzhard Bultmann, Wedemark (DE)

(73) Assignee: Schefenacker-Engelmann Spiegel GmbH, Schwalkheim (DE)

( * ) Notice: Subject to any disclaimer, the term of this patent is extended or adjusted under 35 U.S.C. 154(b) by 86 days.

(21) Appl. No.: 10/974,024

(22) Filed: Oct. 27, 2004

(65) Prior Publication Data
US 2005/0134079 A1    Jun. 23, 2005

(30) Foreign Application Priority Data
Oct. 29, 2003   (DE) ................ 103 50 466

(51) Int. Cl.
*B62D 25/00*   (2006.01)
(52) U.S. Cl. .................................. 296/97.22
(58) Field of Classification Search ........... 296/97.22, 296/147, 148, 155; 220/86.2
See application file for complete search history.

(56) References Cited
U.S. PATENT DOCUMENTS
2,783,057 A * 2/1957 Buck ................ 296/97.22

6,231,107 B1 * 5/2001 Mukai ................ 296/97.22
6,312,044 B1 * 11/2001 Vigano' ................ 296/147
2005/0194810 A1 * 9/2005 Beck ................ 296/97.22

FOREIGN PATENT DOCUMENTS

| DE | 4425838 | 1/1996 |
|---|---|---|
| DE | 9860401 | 6/2000 |
| DE | 199 35 454 A1 | 3/2001 |
| DE | 9935454 | 3/2001 |
| EP | 1 090 796 A2 | 4/2001 |

OTHER PUBLICATIONS

Patent Abstracts of Japan for Japanese Patent Publication No. 58185325, published Oct. 29, 1983.

* cited by examiner

*Primary Examiner*—Lori L. Lyjak
(74) *Attorney, Agent, or Firm*—Greenblum & Bernstein, P.L.C.

(57) ABSTRACT

A device for closing an access opening in a motor vehicle outer skin, especially a tank access opening, having a closure flap that swivels from a closed position into an access position. The closure flap closes essentially flush with the motor vehicle outer skin in the closed position and the closure flap is mounted in such a manner as to be displaceable essentially orthogonally with respect to the motor vehicle outer skin and swivelable about a swivel axis that is essentially orthogonally oriented with respect to the motor vehicle outer skin.

20 Claims, 1 Drawing Sheet

DEVICE FOR CLOSING AN ACCESS OPENING IN A MOTOR VEHICLE OUTER SKIN

FIELD OF THE INVENTION

The invention is related to a device for closing an access opening in a motor vehicle outer skin, especially a tank access opening, having a closure flap that swivels out from a closed position into an access position, where the closure flap closes essentially flush with the vehicle outer skin in the closed position.

DESCRIPTION OF THE RELATED ART

It is known in the art that a tank filler neck, which is closed with a tank cap, is disposed in a filler-neck compartment, the access opening being closeable via a tank flap. This tank flap closes essentially flush with the outer skin of the motor vehicle and as a rule is painted the same color as the motor vehicle. To open the access opening, the tank flap can be popped up since the tank flap is swiveled about an axis that is essentially coplanar with the motor vehicle outer skin surrounding the closure flap or parallel to it, so that in the open position the closure flap is flipped out. In the open position, the closure flap is more or less perpendicular to the motor vehicle outer skin.

The protrusion of the closure flap may result in articles of clothing or fuel nozzles getting hooked; likewise, a closure flap that is flipped open causes problems during driving if one forgets to close it.

SUMMARY OF INVENTION

The object of the present invention is to provide an improved device for closing an access opening in a motor vehicle outer skin.

According to the invention, the closure flap is mounted so as to be displaceable essentially orthogonally in relation to the motor vehicle outer skin and swivelable about a swivel axis that is essentially orthogonally oriented to the motor vehicle outer skin. With the device of the invention, it is possible that the closure flap is first shifted in the direction of the vehicle interior or the vehicle exterior so that the closure flap is swivelable above or below the motor vehicle outer skin. Via a swivel mounting about an axis essentially parallel to the displacement axis; that is, perpendicular to the motor vehicle outer skin, it is possible to open the access opening in that the closure flap is swiveled more or less completely out of the contour of the access opening and displaced above or below the motor vehicle outer skin. In particular an inward shift and a swiveling below the motor vehicle outer skin has the advantage that the closure flap does not disruptively project from the contour of the motor vehicle, so the risk of something getting hooked is prevented. Moreover, the disruptive effects that result from the closure flap not being closed are minimized.

A further development of the invention provides that a drive is assigned to the closure flap, especially a motor that shifts the closure flap inward or outward and after the shift swivels it above or below the motor vehicle outer skin about the corresponding axis of rotation. In this way it is possible to activate the drive using a switch inside the motor vehicle or a remote control, which is integrated in the motor vehicle key, for example, and make the closure flap shift and swivel. Alternatively to a motorized drive, a manual drive may be provided, for example, even as an emergency operation in the event that the motor is not operational.

Advantageously, when the closure flap can be shifted inward, the axis of rotation is outside of the contour of the closure flap so that, when there is swiveling about the access of rotation, the access opening is completely opened. When it is provided that there is an outward shift so that the closure flap protrudes past the motor vehicle outer skin, the axis of rotation is advantageously inside the contour of the closure flap in order to be able to carry out as undisturbed a swiveling movement as possible.

Moreover, it is provided that the closure flap is disposed on a carrier element that is mounted in a displaceable and swiveling manner so that the closure flap is set up in two pieces and a painting of the tank flap outer skin is possible both on the assembly line as well as externally. Based on the fact that the inner side of the closure flap is no longer visible, no additional painting is needed for the inner side, as is the case in traditional systems. In this way, the costs for the production of the tank flap are minimized. Because of the two-piece structure of the tank flap, it is possible that the tank flap outer skin is painted together with the remaining vehicle body independent of the carrier element so that color differences in the vehicle body do not occur.

The closure flap is advantageously fixed in a positive engagement or adhered to the carrier element, it being possible to make the closure flap as a whole or the closure flap outer skin out of plastic or metal.

In order to prevent disturbances in the course of the opening movement, a friction clutch is disposed between the drive and the closure flap so that the tank flap cannot be swiveled beyond a prescribed dimension, which is predetermined, for example, by a stop. If the closure flap runs against this stop, the friction clutch is activated in order to protect the friction clutch and the drive.

The device is advantageously designed as a module that comprises a closure flap, which is designed as a tank flap and is prefabricated together with the drive and a filler-neck compartment. An integrated soft component or seal for sealing off the system from dust, water and motor vehicle gases and a carrier element for the tank flap are also provided. A drain for fuel or water in the area of the tank filler neck may likewise be integrated in the system and comprises a plurality of components. The design as a completely mountable module makes later mounting in the motor vehicle considerably easier.

Alternatively to a motorized drive, a manual system is also conceivable in which the drive is designed as a fault element and the movement during opening and closing is brought about using a spring element.

BRIEF DESCRIPTION OF DRAWINGS

An exemplary embodiment of the invention is explained in detail below with reference to the accompanying figures.

DETAILED DESCRIPTION OF EMBODIMENTS

Figure 1:
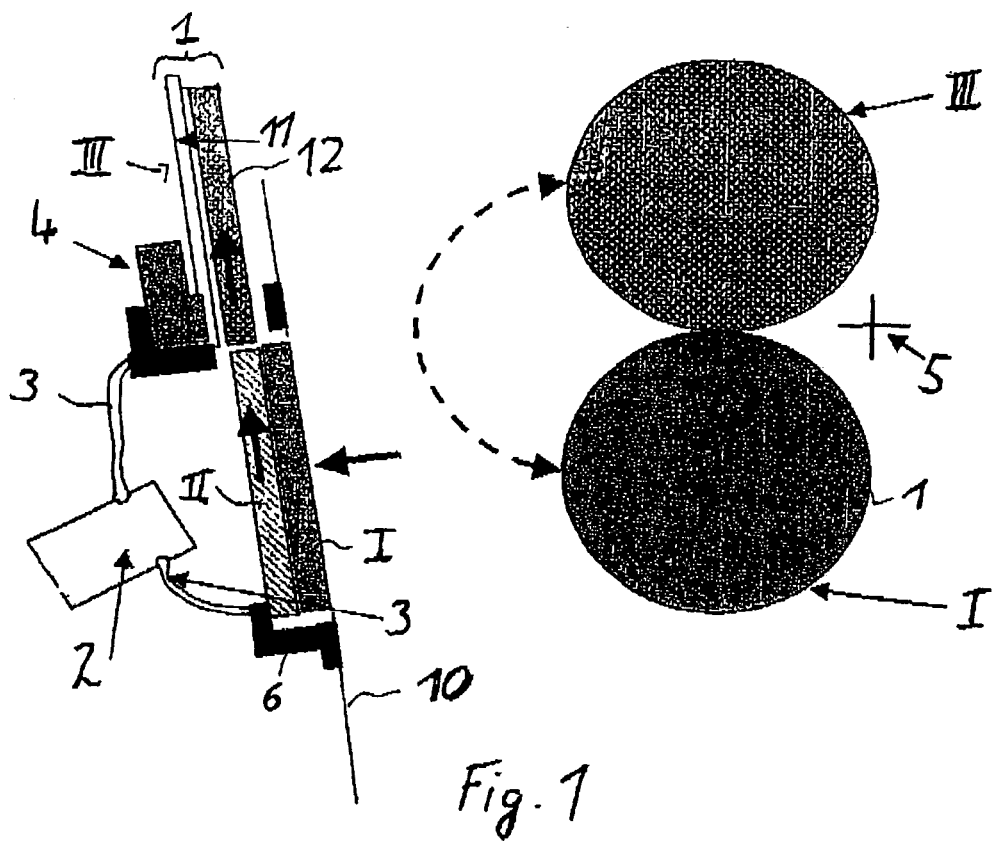
FIG. 1 a first variant of the device in top view and sectional view.

Shown in FIG. 1 in the right-hand illustration is a top view of a tank flap 1 in a closed position I. Tank flap 1 is swivel-mounted about an axis of rotation 5 and displaceable parallel to axis of rotation 5. Tank flap 1 may be swiveled from closed position I into an open position III, as is indicated by the dashed double arrow line. From open position I tank flap 1 may be swiveled back and shifted into the closed position.

In the left-hand illustration of FIG. 1, the device is shown in a cross-sectional view, three phases of the opening of an access opening being shown in this illustration. In the closed position I, tank flap 1 is closed flush with a motor vehicle outer skin 10 so that an essentially seamless transition between the motor vehicle outer skin 10 and the tank flap 1 is produced. To open the tank flap 1, as indicated by the arrow directed perpendicular to the tank flap 1, the tank flap 1 is shifted out of the closed position I into an intermediate position II, the displacement movement running essentially orthogonally with respect to the tank flap 1 and the motor vehicle outer skin 10. According to FIG. 1, the tank flap 1 shifts in the direction of the vehicle interior until it has reached intermediate position II, in which the outer surface of the tank flap 1 lies below the motor vehicle outer skin 10. At this point in time, a swiveling has not yet occurred, and the tank flap 1 is inside the contour of the access opening, in this case the tank access opening.

After reaching intermediate position II, the tank flap 1 swivels about axis of rotation 5, which is also oriented perpendicular to motor vehicle outer skin 10 or perpendicular to the surface extension of the tank flap 1. The swiveling is indicated by the two arrows disposed one after the other.

After the complete swiveling or swinging out of the tank flap 1 from the access opening, a tank filler neck 2 is opened, which in some cases was closed by a tank cap, and tank filling can occur. After the termination of the tank filling process, the tank flap 1 swivels back about axis of rotation 5, until it is back inside the contour of the access opening in order to then shift back outward until the outer surface of tank flap 1 is coplanar with motor vehicle outer skin 10.

A seal 3 can be disposed around tank flap 1 so that filler-neck compartment 6 is protected from the penetration of dirt and water. The seal 3 is configured at the filler-neck compartment 6 that accommodates tank filler neck 2 and thus reliably seals off the vehicle interior from moisture, leaked fuel or dirt.

To effect the displacement movement in the direction of the tank filler neck 2 and the swiveling out from the contour of the access opening, a motorized drive 4 is provided that is designed as a positioning motor.

Figure 2:
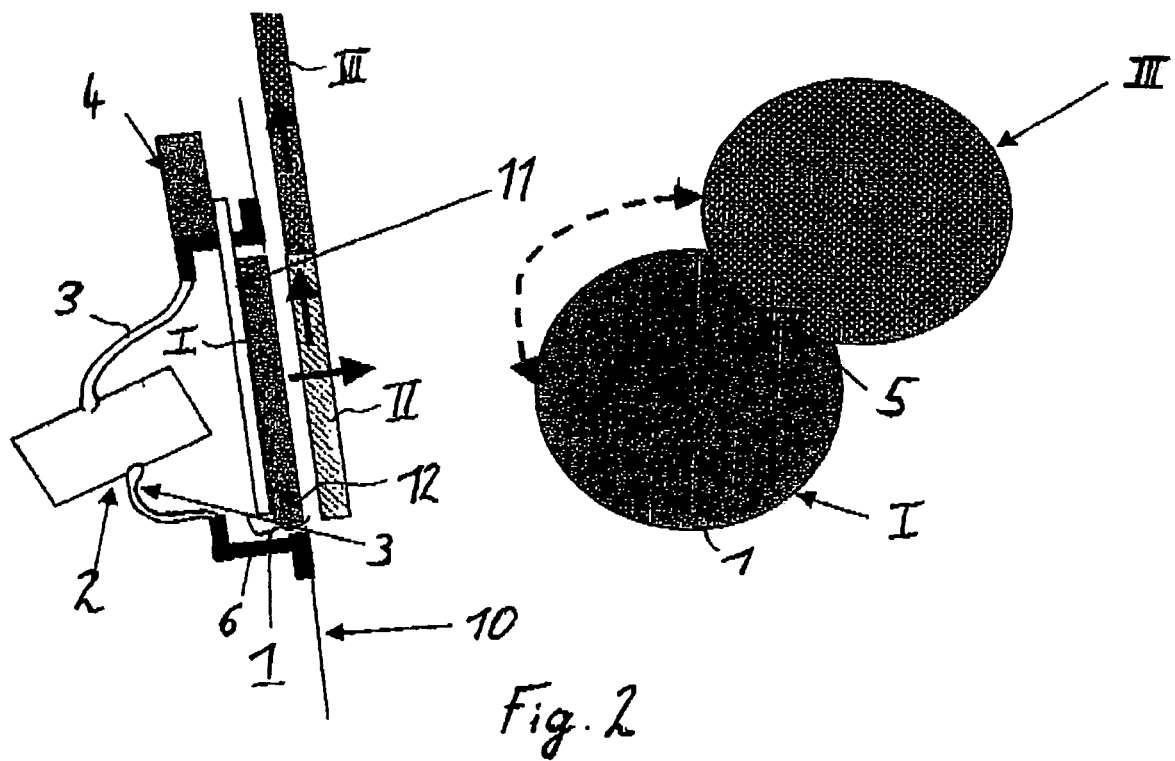
FIG. 2 a second variant of the device in top view and sectional view.

Illustrated in FIG. 2 is a variant of the device according to the invention in which the tank flap 1 is displaced not inward in the direction of the tank filler neck 2, but outward in the opposite direction. In the right-hand illustration in a top view it is shown that axis of rotation is inside the contour of tank flap 1 so that, starting from the closed position I during the entire swiveling movement about the axis of rotation 5 a certain surface area of the access opening is overlapped by tank flap 1. In the right-hand illustration of FIG. 2, this is clearly shown in reference to the overlap between closed position I and open position III.

In FIG. 2 in the left-hand illustration, it is evident that the tank flap 1 is first displaced outward; that is, in the direction away from tank filler neck 2, the displacement direction running perpendicular to the surface extension of tank flap 1. After reaching intermediate position II, in which the bottom of tank flap 1 is spaced away from the motor vehicle outer skin and projects past it, a swiveling movement about the axis of rotation 6 is initiated by the motorized drive 4 and tank flap 1 is swiveled until tank filler neck 2 is opened. To close the access opening, the sequence of movements is reversed.

Also according to FIG. 2, the device is designed as a system that comprises the motorized drive 4, the filler-neck compartment 6 with integrated soft components for sealing out dust, water and fuel gases and a carrier element 11 on which a tank flap outer skin 12 is applied. Moreover, a drain for fuel, water and the like that is integrated in the overall system is provided in the area of filler neck 2.

Both in FIG. 1 and in FIG. 2, the tank flap 1 is designed as a second component comprising a carrier element 11 and a tank flap outer skin 12. This has the advantage that a module made up of carrier element, drive unit and filler-neck compartment maybe pre-assembled with corresponding seals 3 and drains, while tank flap outer skin 12 is painted together with the rest of the body. An installation of the tank flap module may occur after the painting of the motor vehicle and the tank flap outer skin can then be connected in a positive engagement with carrier element 11 or adhered to it. In this way, it is possible to compensate for potential misalignments. Moreover, the device according to the invention makes painting the back side of tank flap 1 or tank flap outer skin 12 unnecessary since it is no longer visible.

Alternatively to a motorized drive, a manual drive or a manual system is provided in which the closing or opening of the tank flap is effected via a spring element.

The contents of German application no. 103 50 466.4 is incorporated herein in its entirety by reference.

The invention claimed is:

1. A device for closing an access opening in a motor vehicle outer skin, comprising a closure flap that swivels from a closed position into an access position, the closure flap closing essentially flush with the motor vehicle outer skin in a closed position, wherein the closure flap is mounted to be:
   displaceable essentially orthogonally inward with respect to the motor vehicle outer skin to an intermediate position below the motor vehicle outer skin, and
   swivelable about a swivel axis that is essentially orthogonally oriented with respect to the motor vehicle outer skin.

2. A device for closing an access opening in a motor vehicle outer skin, comprising a closure flap that swivels from a closed position into an access position, the closure flap closing essentially flush with the motor vehicle outer skin in a closed position, wherein the closure flap is mounted to be displaceable essentially orthogonally with respect to the motor vehicle outer skin and swivelable about a swivel axis that is essentially orthogonally oriented with respect to the motor vehicle outer skin, and the closure flap is assigned a drive that displaces the closure flap inward or outward and swivels it about the swivel axis.

3. A device for closing an access opening in a motor vehicle outer skin, comprising a closure flap that swivels from a closed position into an access position, the closure flap closing essentially flush with the motor vehicle outer skin in a closed position, wherein:
   the closure flap is mounted to be displaceable essentially orthogonally with respect to the motor vehicle outer skin and swivelable about a swivel axis that is essentially orthogonally oriented with respect to the motor vehicle outer skin, and
   the swivel axis lies outside a contour of the closure flap.

4. The device as described in claim 1, wherein the closure flap has a closure flap outer skin assigned to a carrier element, which is mounted in a displaceable and swiveling manner.

5. The device as described in claim 4, wherein the closure flap outer skin is fixed or adhered to the carrier element.

6. The device as described in claim 4, wherein the closure flap or the closure flap outer skin is made out of plastic or metal.

7. The device as described in claim 2, wherein the drive may be activated by at least one of: a switch in the motor vehicle interior, and a remote control.

8. The device as described in claim 2, wherein a friction clutch is disposed between the drive and the closure flap.

9. The device as described in claim 1, wherein the closure flap is designed as a tank flap and together with a drive and a filler neck compartment forms a module.

10. The device as described in claim 2, wherein the drive is a spring element.

11. The device as described in claim 2, wherein the drive is a motorized drive.

12. The device as described in claim 2, wherein the drive is activated by a remote control which is integrated into a motor vehicle key.

13. The device as described in claim 1, further comprising a drive that displaces the closure flap and swivels the closure flap about the swivel axis.

14. The device as described in claim 13, wherein the drive is a spring element.

15. The device as described in claim 13, wherein the drive is a motorized drive.

16. The device as described in claim 13, wherein the drive is activated by one of: a switch in the motor vehicle interior, and a remote control.

17. The device as described in claim 3, further comprising a drive that displaces the closure flap and swivels the closure flap about the swivel axis.

18. The device as described in claim 17, wherein the drive is a spring element.

19. The device as described in claim 17, wherein the drive is a motorized drive.

20. The device as described in claim 17, wherein the drive is activated by one of: a switch in the motor vehicle interior, and a remote control.

* * * * *